(12) United States Patent
Alnås

(10) Patent No.: US 12,132,806 B2
(45) Date of Patent: Oct. 29, 2024

(54) RELOCATION OF APPLICATION CONTEXT TO EDGE DATA NETWORK

(71) Applicant: Sony Group Corporation, Tokyo (JP)

(72) Inventor: Svante Alnås, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/913,766

(22) PCT Filed: Mar. 17, 2021

(86) PCT No.: PCT/EP2021/056882
§ 371 (c)(1),
(2) Date: Sep. 22, 2022

(87) PCT Pub. No.: WO2021/204510
PCT Pub. Date: Oct. 14, 2021

(65) Prior Publication Data
US 2023/0262143 A1 Aug. 17, 2023

(30) Foreign Application Priority Data
Apr. 6, 2020 (SE) .................................... 2050390-0

(51) Int. Cl.
*H04L 67/63* (2022.01)
*H04L 67/141* (2022.01)

(52) U.S. Cl.
CPC ............ *H04L 67/63* (2022.05); *H04L 67/141* (2013.01)

(58) Field of Classification Search
CPC .............................. H04L 67/63; H04L 67/141
See application file for complete search history.

(56) References Cited

U.S. PATENT DOCUMENTS

| 10,206,094 B1* | 2/2019 | Wen | H04W 64/006 |
| 2003/0105903 A1* | 6/2003 | Garnett | G06F 21/55 710/300 |

(Continued)

FOREIGN PATENT DOCUMENTS

| CN | 108737271 A | 11/2018 | |
| EP | 3373523 A1 * | 9/2018 | H04L 12/28 |

(Continued)

OTHER PUBLICATIONS

International Search Report and Written Opinion from corresponding International Application No. PCT/EP2021/056882, mailed on Jun. 1, 2021, 11 pages.

(Continued)

*Primary Examiner* — Shean Tokuta
(74) *Attorney, Agent, or Firm* — Tucker Ellis LLP

(57) ABSTRACT

A method carried out in a user equipment, UE (10), for enabling transfer of application context from a first edge data network (140) to a second edge data network (150), comprising: storing (702), in the UE, a data object (60), said data object comprising: routing information to the first edge data network, and a context identifier (62), based on which the first edge data network uniquely can identify the application context of the UE on an application server in the first edge data network; uploading (708), upon connecting (706) to the second edge data network, the data object to the second edge data network to enable the second edge data network to obtain the application context in response to supplying the context identifier to the first data network.

11 Claims, 6 Drawing Sheets

(56) References Cited

U.S. PATENT DOCUMENTS

| | | | |
|---|---|---|---|
| 2011/0145434 A1* | 6/2011 | Ringen | H04L 45/033 709/238 |
| 2017/0331670 A1 | 11/2017 | Parkvall | |
| 2018/0270720 A1 | 9/2018 | Shi | |
| 2019/0191344 A1* | 6/2019 | Wen | H04W 36/0061 |
| 2019/0222640 A1* | 7/2019 | Tock | G06F 9/542 |
| 2019/0258499 A1* | 8/2019 | Annapragada | G06F 8/63 |
| 2020/0314693 A1* | 10/2020 | Xu | H04L 45/64 |
| 2020/0366732 A1 | 11/2020 | Trang | |
| 2021/0058489 A1* | 2/2021 | Kim | H04L 67/1031 |
| 2021/0352156 A1* | 11/2021 | Kim | H04W 8/24 |
| 2022/0015018 A1* | 1/2022 | Kim | H04W 48/16 |
| 2022/0110022 A1* | 4/2022 | Featherstone | H04W 28/12 |
| 2022/0338113 A1* | 10/2022 | Gupta | H04W 24/10 |
| 2023/0053805 A1* | 2/2023 | Kim | H04L 67/63 |
| 2023/0135864 A1* | 5/2023 | Sodagar | H04L 67/63 709/217 |
| 2023/0164234 A1* | 5/2023 | Ge | H04L 67/148 709/206 |
| 2023/0262143 A1* | 8/2023 | Alnås | H04L 67/63 709/238 |

FOREIGN PATENT DOCUMENTS

| | | | | |
|---|---|---|---|---|
| WO | WO-2017091960 A1 | * | 6/2017 | H04L 12/28 |
| WO | WO-2019117793 A1 | * | 6/2019 | G06F 9/5088 |
| WO | WO-2021204510 A1 | * | 10/2021 | H04L 67/141 |
| WO | WO-2021223637 A1 | * | 11/2021 | |
| WO | WO-2023051581 A1 | * | 4/2023 | |

OTHER PUBLICATIONS

Third Generation Partnership Project (3GPP), "Technical Specification Group Services and System Aspects; Study on application architecture for enabling Edge Applications (Release 17)", 3GPP TR 23.758, V17.0.0, Dec. 2019, 113 pages.

Office Action and Search Report from corresponding Swedish Application No. 2050390-0, mailed on Feb. 5, 2021, 11 pages.

ETSI, "Mobile Edge Computing (MEC); End to End Mobility Aspects", ETSI GR MEC 018 V1.1.1, Oct. 2017, 52 pages.

* cited by examiner

RELOCATION OF APPLICATION CONTEXT TO EDGE DATA NETWORK

TECHNICAL FIELD

The invention and its embodiments are related to the field of edge computing, and specifically to the connection of a user equipment to an edge data network configured to provide computing resources to the user equipment. Specifically, solutions are provided for relocation of an application context associated with the user equipment.

BACKGROUND

The development of cloud-based services, operating to assist mobile devices with network-assisted storage and computing, is heavily increasing. ETSI (European Telecommunication Standards Institute) has promoted a technology originally denoted Mobile Edge Computing (MEC), which is being standardized in an ETSI Industry Specification Group (ISG) of the same name. In the second phase of ETSI MEC ISG this is replaced by the term Multi-access Edge Computing, using the same acronym MEC, which also includes other types of access besides cellular, e.g. wifi and fixed networks.

More recently, the 3rd Generation Partnership Project (3GPP) has provided the Study on application architecture for enabling edge applications in 3GPP TR 23.758, and a draft state specification entitled Architecture for enabling edge applications, 3GPP TS 23.558.

On a general level, a User Equipment (UE) may access computing resources through a communication network, e.g. for the purpose of off-loading demanding compute tasks to more powerful resources in an Edge Data Network (EDN). This may be carried out by communication between the UE and the EDN over a communication network, such as a wireless radio network, e.g. a cellular network or a WLAN such as a 3GPP 802.11 wifi connection. It may be noted that alternative terminology may include Edge Hosting Environment and Edge Computing System, which may correlate to or comprise an EDN, but the term EDN will mostly be used herein for the sake of simplicity and stringency.

One aspect of edge computing is relocation, meaning that a UE transfers from being supported by a first, source, EDN to a second, target, EDN. Such relocation involves moving, or relocating, so called application context associated with the UE. Application context may comprise data associated with an application run by the UE with assistance from the EDN. According to current proposals, relocation involves the source EDN detecting mobility and selecting a target EDN. The target EDN of the new edge hosting environment is then expected to retrieve the application context of the UE. However, such a solution will not cover a situation where a UE moves to a new edge hosting environment comprising target EDN after losing connection with a previous, source, EDN.

SUMMARY

There consequently exits a need for improvement in the art of hosting of edge computing resources, specifically related to transfer of application context when a US connects to a new EDN. Such transfer is applicable upon a UE moving from one EDN to another and may be referred to as relocation of application context when. This may be carried out when the UE is still connected to the previous EDN, or after having disconnected from the previous EDN. Optionally, transfer of application context may be considered when a UE being connected to a first EDN further connects to a second EDN, for obtaining edge computing resources. Such changes may be triggered by mobility of the UE, but it should be noted that moving from one EDN to another does not necessarily imply physical mobility of the UE. Connecting to another EDN, such as changing from one EDN to another, may alternatively be triggered by optimization of resources or other reasons.

Various solutions for handling relocation are set out in the appended claims.

BRIEF DESCRIPTION OF THE DRAWINGS

Various embodiments will be outlined below with reference to the drawings, on which FIG. 1 schematically illustrates two different EDNs which are connected to communication networks, and a UE configured to connect to the EDNs via the communication networks.

DESCRIPTION OF EMBODIMENTS

Figure 1:
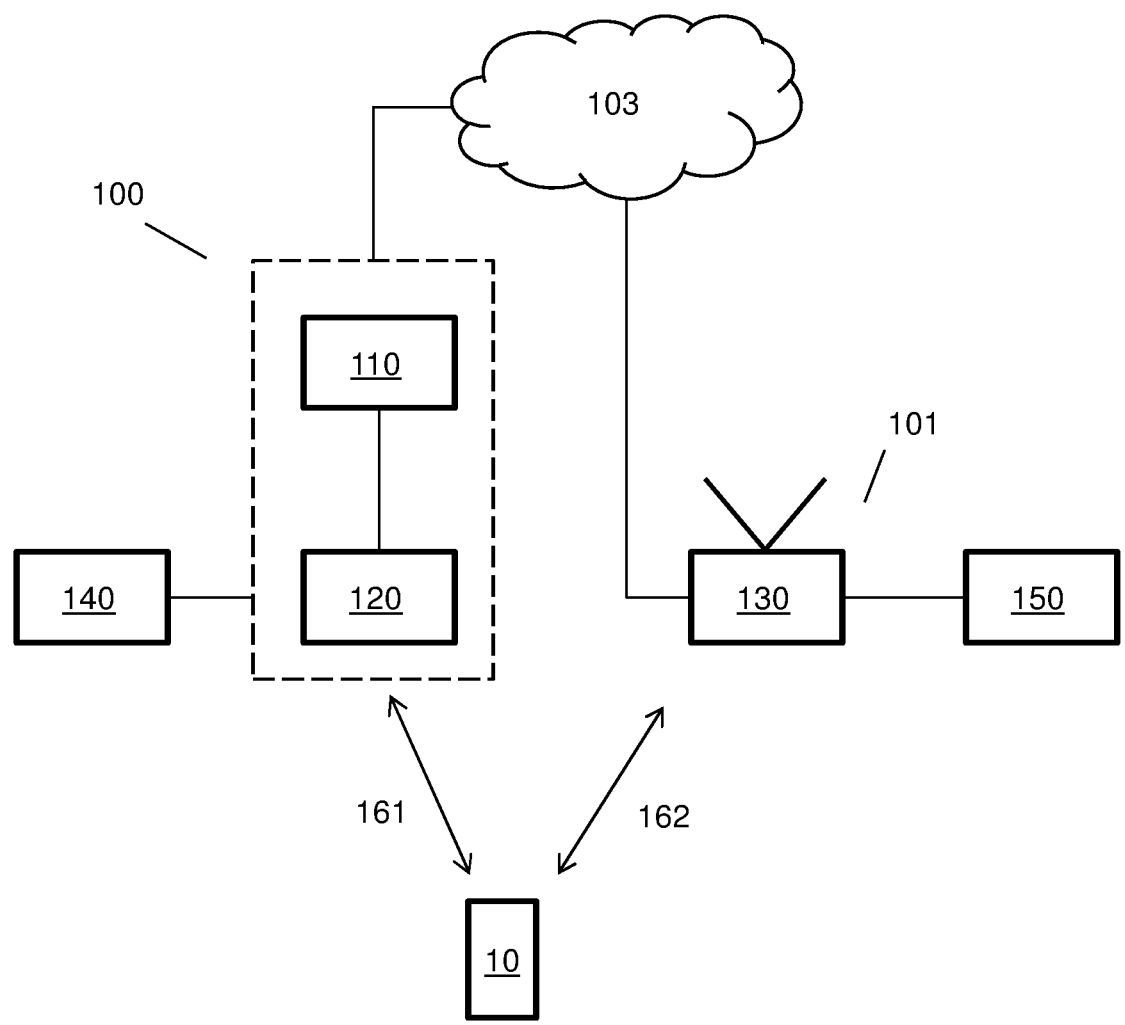

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Edge Computing (EC) is thought of as a natural development in the evolution of mobile radio stations and the convergence of IT and telecommunication networking. EC is based on a virtualized platform and will enable applications and services to be hosted 'on top' of mobile network elements, i.e. above the network layer. These applications and services can benefit from being in close proximity to the customer and from receiving local radio-network contextual information. The environment of EC is characterized by low latency, proximity, high bandwidth, and real-time insight into radio network information and location awareness, accomplished with EC servers hosting operator or 3rd party applications. As such, EC may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. EC will allow software applications to tap into local content and real-time information about local-access network conditions. By deploying various services and caching content at the network edge, mobile core networks are alleviated of further congestion and can efficiently serve local purposes.

FIG. 1 schematically illustrates a scene in which the proposed solutions may take place. A UE 10 is configured to communicate with one or more communication networks, which may operate as different communication systems. As a mere example, the drawing of FIG. 1 illustrates a first communication network 100 in the form of a cellular communication network. The first communication network 100 comprises a core network 110, connected to other networks 103, such as the Internet. The first network 100 further comprises an access network which in turn typically comprises a plurality of base stations, of which one base station 120 is shown. In a 5G communication network, such a base station 120 is referred to as a gNB, but the first communication network may alternatively operate as another type of system, such as LTE or other. A first EDN 140 is accessible by connection through the first communication network 100. It shall be noted, though, that various parts of the EDN 140 may be located in different places, and both computing resources and supporting servers in the EDN 140 may be provided by cloud resources.

A second communication network 101 is further shown, comprising a wireless local area network (WLAN) hotspot 130. Such a WLAN system is not cellular, but the network 101 may nevertheless comprise a plurality of hotspots, each covering a certain area. A second EDN 150 is accessible by connection through the second communication network 101. Again, it shall be noted that various parts of the EDN 150 may be located in different places, and both computing resources and supporting servers in the EDN 150 may be provided by cloud resources.

It shall be noted that the aspects of the solutions proposed herein are applicable to relocation of application context between EDNs connected to different communication networks, of different system types as illustrated in FIG. 1 or of the same system type (e.g. both cellular), or alternatively to relocation between different EDNs accessible through one and the same communication network, such as the first communication network 100 of FIG. 1. The drawing is thus merely one example of an implementation scenario.

Figure 2:
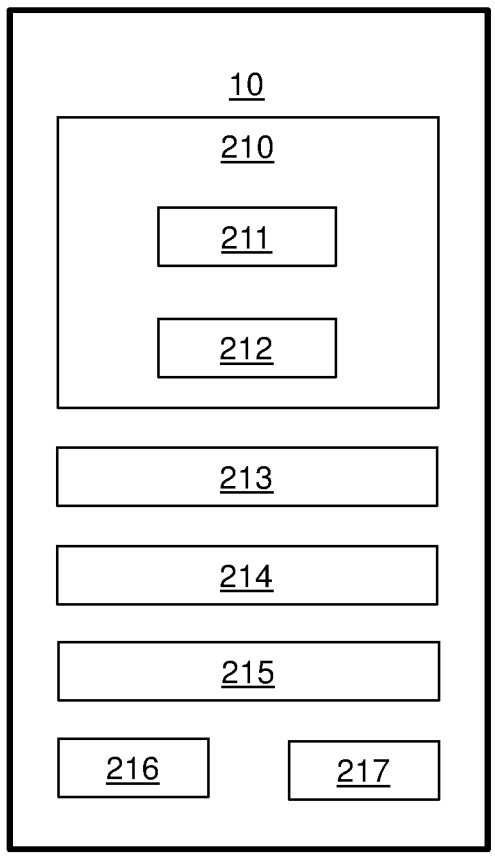
FIG. 2 schematically illustrates a UE with various included functional elements, according to various embodiments as outlined herein.

FIG. 2 schematically illustrates an embodiment of the UE 10 configured to carry out a method as presented herein.

The UE 10 may comprise a wireless transceiver 213, such as a radio unit comprising a radio transceiver for communicating with one or more communication networks 100, 101, such as the base station 120 or the hotspot 130. The radio unit 213 may thus include a radio receiver and transmitter for communicating through at least an air interface.

The UE 10 further comprises logic 210 configured to communicate data, via the wireless transceiver, to the wireless communication network 100, 101.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the UE 10 to carry out any of the method steps as provided herein. Software defined by said computer program code may include an application or a program that provides a function and/or a process. The software may include device firmware, an operating system (OS), or a variety of applications that may execute in the logic 210.

The UE 10 may further comprise, or be connected to, an antenna 214, which may include an antenna array.

The UE further comprises a data memory 215, for storing data and computer code associated with edge computing.

Obviously, the UE 10 may include other features and elements than those shown in the drawing or described herein, such as a power supply, a casing, a user interface, one or more sensors etc.

Figure 4:
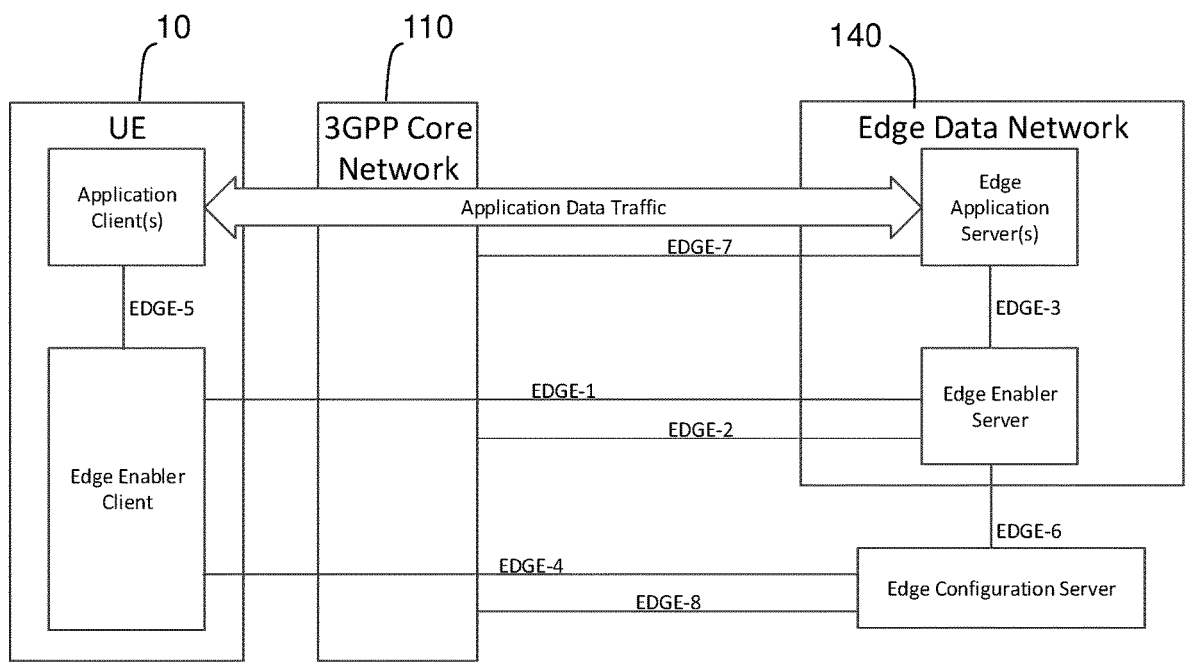
FIG. 4 schematically illustrates an architecture for enabling edge applications according to various embodiments.

FIG. 4 schematically illustrates an architecture for enabling edge applications according to various embodiments. For the sake of simplicity, reference will be made to the EDN 140, but a similar layout may be provided for the EDN 150. In the shown embodiment, the EDN 140 comprises one or more Edge Application Server(s) (EAS) and an Edge Enabler Server (EES). An Edge Configuration Server (ECS) is provides configurations related to the EDN. The logic 210 of UE 10 is configured to realize edge computing modules in the UE 10, comprising one or more Application Client(s) 216 and an Edge Enabler Client (EEC) 217. The EAS(s), the EAS and the ECS may interact with the 3GPP Core Network 110. The EEC may in various embodiments comprise both an Edge Enabler Client and Edge Configuration Client.

In various embodiments, the elements as illustrated in FIG. 4 may provide different functional entities. The EES may be configured to provide supporting functions needed for EAS(s) and EEC. Functionalities of Edge Enabler Server may include:
 a) provisioning of configuration information to enable the exchange of Application Data Traffic with the Edge Application Server;
 b) providing information related to the Edge Application Servers to the Edge Enabler Client; and
 c) support the functionalities of API invoker and API exposing function as specified in 3GPP TS 23.222.

The Edge Enabler Client (EEC) is configured to provide supporting functions needed for Application Client(s) in the UE 10, and functionalities of Edge Enabler Client may include:
 a) retrieval and provisioning of configuration information to enable the exchange of Application Data Traffic with the Edge Application Server; and
 b) discovery of Edge Application Servers available in the Edge Data Network.

The Edge Configuration Server (ECS) may be configured to provide supporting functions needed for the Edge Enabler Client to connect with an Edge Enabler Server. Functionalities of Edge Configuration Server may include provisioning of Edge configuration information to the Edge Enabler Client. The Edge configuration information may include:
 1) the information for the Edge Enabler Client to connect to the Edge Enabler Server (e.g. service area information applicable to Local Area Data Network, LADN); and
 2) the information for establishing a connection with Edge Enabler Servers (such as URI).

The Application Client is the application resident in the UE 10, performing the client function. Details of the Application Client are not as such critical for the proposed solution.

The Edge Application Server (EAS) is the application server resident in the Edge Data Network, performing the server functions. The Application Client connects to the Edge Application Server in order to avail the services of the application with the benefits of Edge Computing.

It is possible that the server functions of an application are available only as Edge Application Server. However, if the server functions of the application are available as both, Edge Application Server and an Application Server resident in cloud, it is possible that the functions of the Edge Application Server and the Application Server are not the same. In addition, if the functions of the Edge Application Server and the Application Server are different, the Application Data Traffic may also be different.

The Edge Application Server may consume the 3GPP Core Network capabilities in different ways, such as:
 a) it may directly invoke 3GPP Core Network functions, if it is an entity trusted by the 3GPP Core Network;
 b) it may invoke 3GPP Core Network capabilities through the Edge Enabler Server; and
 c) it may invoke the 3GPP Core Network capability exposure functions.

Further details of the architecture, and the reference points EDGE-X illustrated in FIG. 4, may be provided as outlined in e.g. 3GPP TS23.558.

Figure 3:
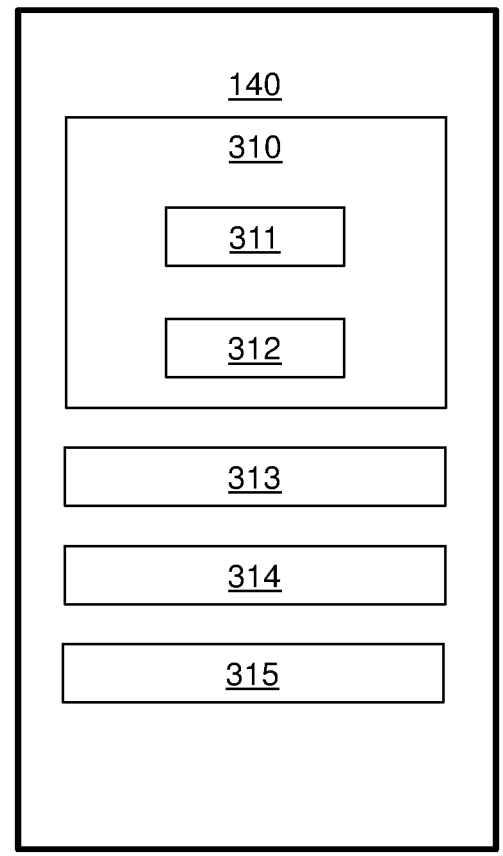
FIG. 3 schematically illustrates an EDN with various included functional elements, according to various embodiments as outlined herein.

FIG. 3 schematically illustrates a different visualization of the EDN 140, which may similar or identical to the EDN 150. As already outlined, it shall be noted that the elements of the EDN 140 may be distributed, and that certain functional components may be provided as cloud resources. The representation in FIG. 3 is thus only schematic.

The EDN 140 may comprise one or more interfaces 313 for providing reference points EDGE-X to a communication network 100, 101 and the UE 10.

The EDN 140 further comprises logic 310 configured to communicate control signals and data with the communication network 100, 101 and the UE 10. The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the base station 130 to carry out any of the method steps as provided herein. Software defined by said computer program code may include an application or a program that provides a function and/or a process. The software may include device firmware, an operating system (OS), or a variety of applications that may execute in the logic 310.

The logic 310 may be configured to render one or more Edge Application Server(s) 314, and an Edge Enabler Server 315, as described with reference to FIG. 4.

Figure 5:
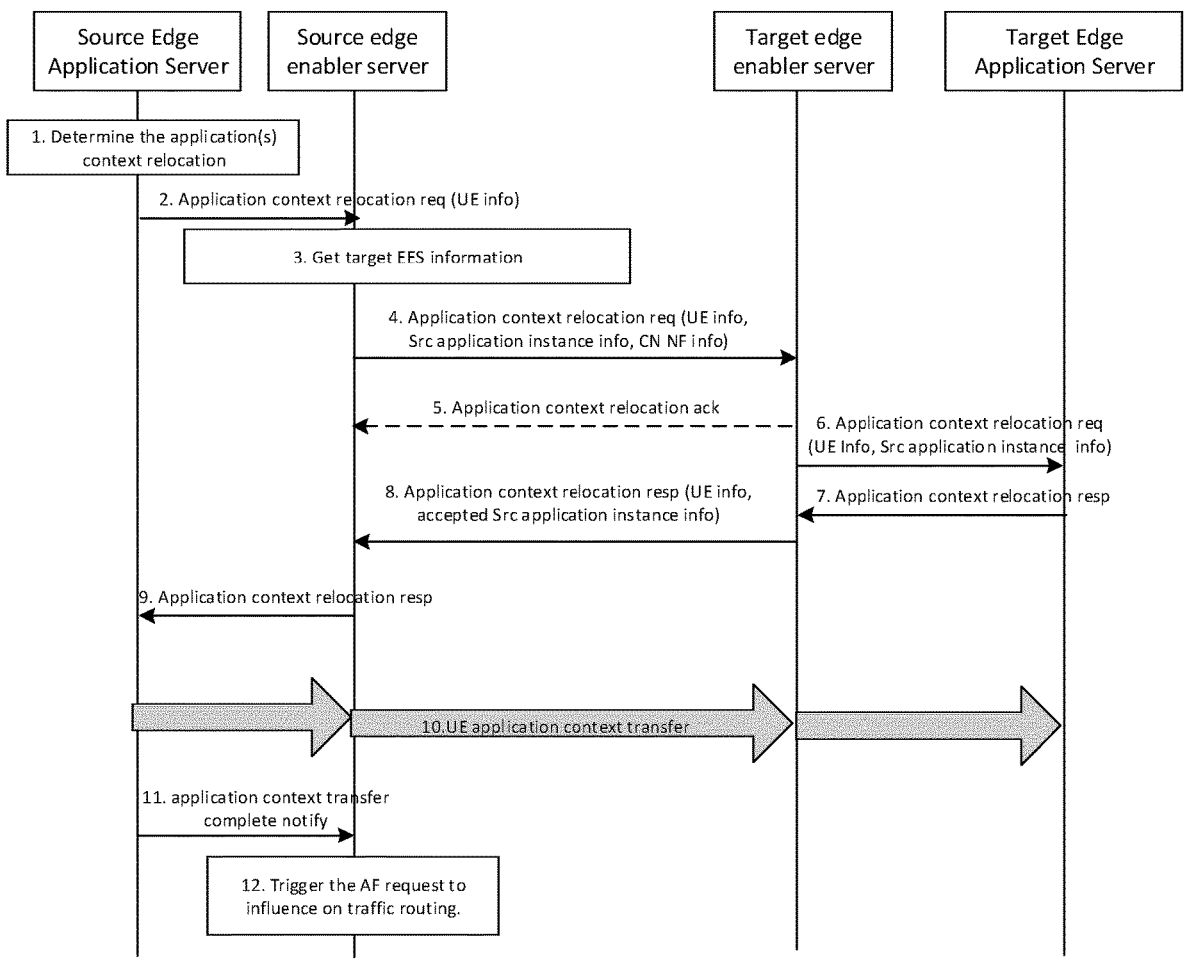
FIG. 5 shows a signaling diagram schematically illustrating application context relocation according to an existing proposal.

FIG. 5 illustrates a suggested solution to the issue of preserving service continuity provided for UEs in edge computing, outlined in inter alia section 7.9 of TR23.758 V2.0.0. In this solution, the Edge Application Server is responsible to make the decision whether the application context for a UE is to be relocated. The Edge Application Server prepares the required UE application context to be relocated and transfers it to the target Edge Application Server. The required UE application context will be transferred via Edge Enabler Servers to the target Edge Application Server. With this solution the UE will not be aware of the application context of the UE being relocated and preserves the service continuity. Further details regarding this proposal is outlined in TR23.758 V2.0.0.

However, one pre-condition of this solution is that the application client at the UE already has a connection to the source Edge Application Server. Moreover, the source Edge Application Server must be configured to subscribe to user plane management events and receives the notifications as described in 3GPP TS 23.502. This sets a limitation on the applicability and usability of the previously proposed solution for context relocation. The assumption has been that the UE never loses its connectivity into the source EDN. An application service provider may want to deploy an Edge Application in for example corporate networks or other networks, reachable via e.g. Wi-Fi or an Internet based "Edge" Application in the cloud, so that the user always has access to the service. However, the performance may vary dependent of the user's connectivity, and these different networks may not have access to each other or be aware of each other.

Today's standard smartphones, such as UE capable of communicating under LTE or 5G, lose connectivity to the operator's Internet over the cellular network 100 as soon as the smartphone connects to Wi-Fi networks 130, and this procedure may not change for a long time. Cellular network operator's applications typically have firewalls that block access from the Internet, so that they are only reachable from their own customers. The corresponding scenario normally applies to corporates Wi Fi networks, where such networks rarely accept access from the Internet to the corporate's infrastructure. Generally, corporate networks may allow specific well-known application servers to access the infrastructure since then it is already preconfigured, well known and predetermined, and the corporate network has control of the expected load of these accesses so then they normally could accept exceptions in the firewalls.

Figure 6A:
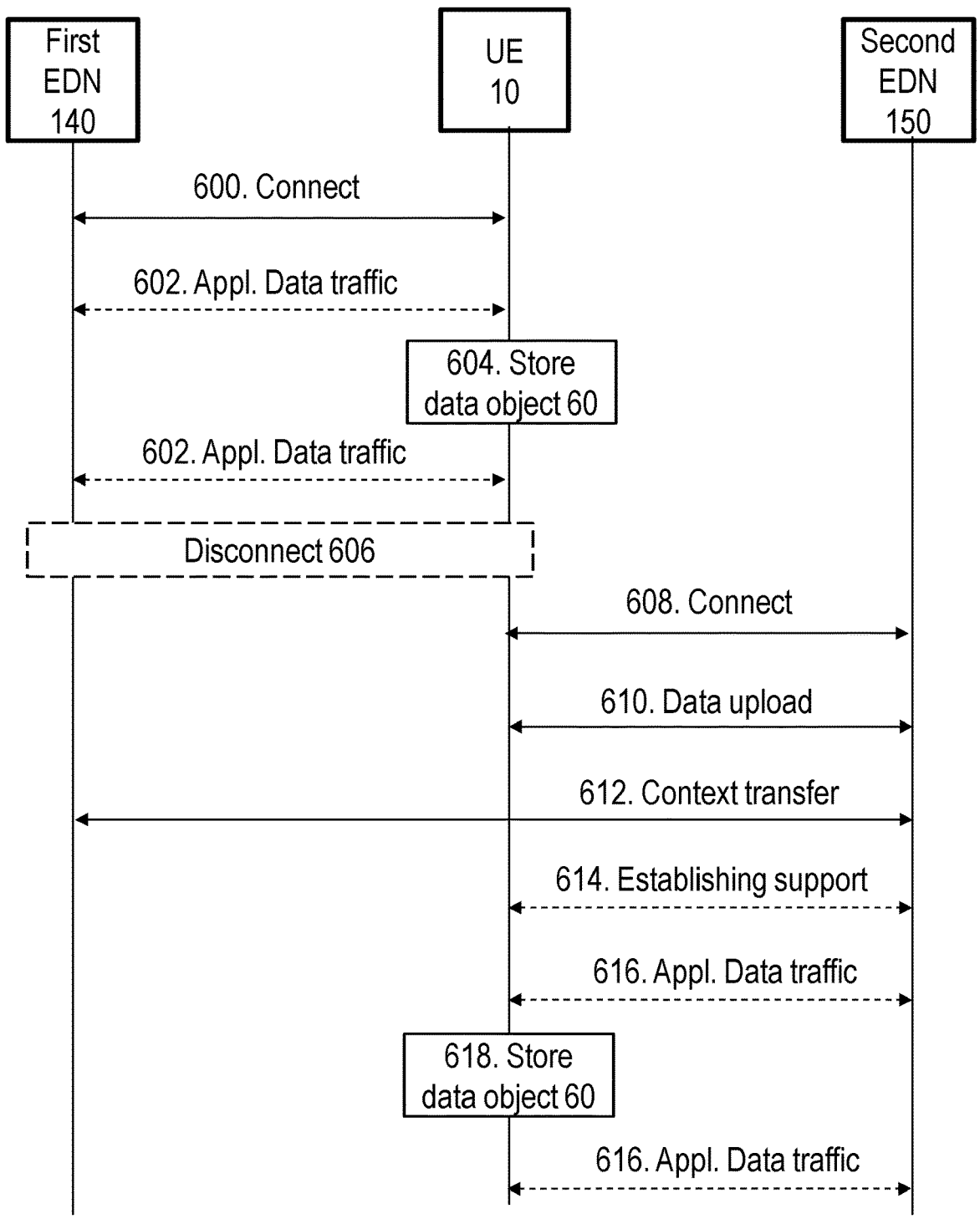
FIG. 6A shows a signaling diagram schematically illustrating application context relocation according to various embodiments outlined herein.
Figure 6B:
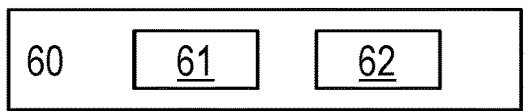
FIG. 6B schematically illustrates a data object comprising routing information, according to various embodiments.
Figure 7:
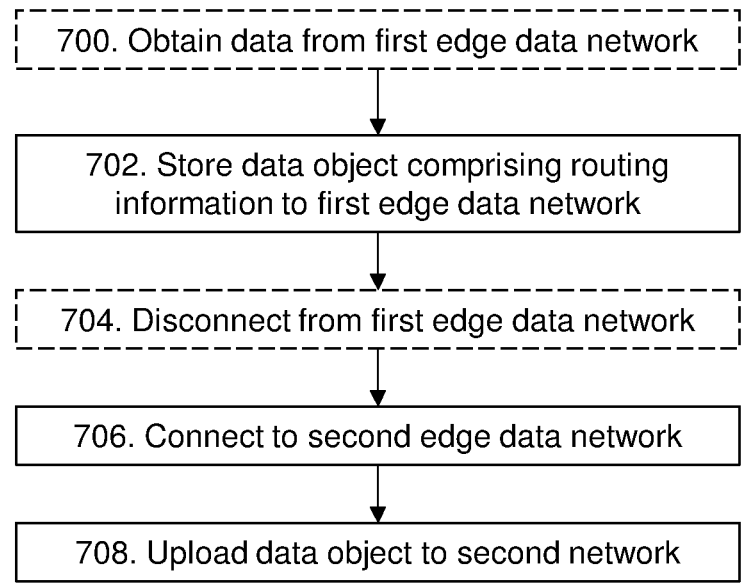
FIG. 7 schematically illustrates a flow chart for a method for application context relocation set out in a UE, according to an embodiment.
Figure 8:
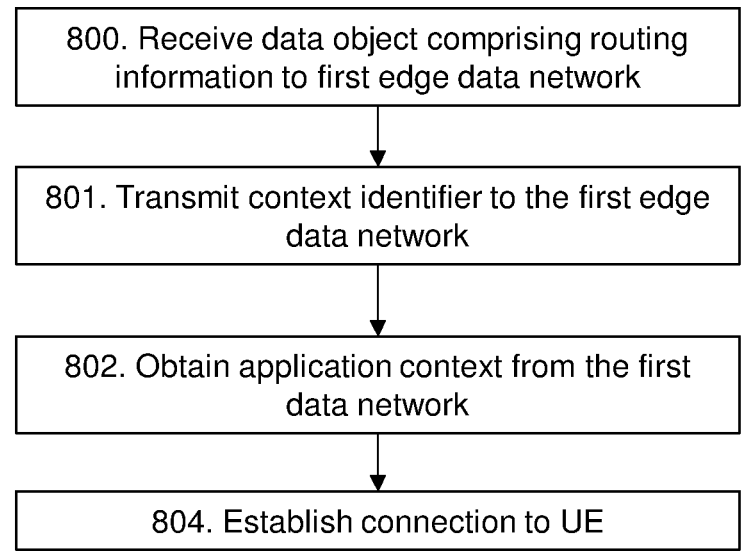
FIG. 8 schematically illustrates a flow chart for a method for application context relocation set out in an EDN, according to an embodiment.

A new proposal for transfer of application context is provided herein, as will be outlined with reference to FIGS. 6-8. The basic idea is that the UE 10 is configured to store a data object comprising routing information to an EDN to which it has been connected. An EDN to which the UE has been connected may here refer to an EDN from which the UE has since disconnected, or alternatively an EDN to which the UE is still connected. The data object may be stored as a cookie in the UE 10.

FIG. 6A schematically illustrates a signaling diagram and messaging between the UE 10, the first EDN 140 and the second EDN 150.

At step 600 the UE connects to the first EDN 140.

In connection with the first EDN 140, the UE obtains computing assistance from the first EDN, wherein application data traffic is communicated 602.

At some point, the UE 10 stores 604 a data object 60, which data object comprises routing information to the first edge data network 140.

FIG. 6B schematically illustrates the data object 60. The data object may comprise a first component 61, usable by other EDNs to identify the first EDN 140. In various embodiments, the first component 61 identifies which EDN entity, e.g. Edge Configuration Server, Edge Enabler Server or Edge Application Server, that was the previous one, or last, to hold or handle the application context of that UE 10. The first component 61 may e.g. be an FQDN (Fully qualified Domain Name) to said EDN entity of the source EDN, i.e. the first EDN 140. The data object 60 may further comprise a second component 62, usable by said EDN entity to identify the specific application context of the UE 10 on a specific Edge Application Server of the first EDN 140. The second component thus comprises a context identifier, uniquely identifying the application context of the UE 10 on an Edge Application Server in the first EDN 140. The EDN 140 thus shares information 61, 62, in the data object, which is strictly usable in that EDN 140 to identify the application context associated with the UE 10, without having to expose internal information such as Source EAS Identity. The source EDN 140 is thus uniquely configured to determine and the location of, and retrieve, the application context in the EDN 140. In some embodiments, the context identifier 62 may be, or be based on, a random number or a hash value, known or decodable solely by the EDN 140 storing the application context.

In some embodiments, the UE may be configured to store a plurality of data objects 60, related to different applications. Moreover, different data objects 60 associated with different applications may reflect routing information to different last used EDNs.

Referring back to FIG. 6A, storing 604 is carried out upon the UE 10 registering to the first EDN 140. In some embodiments, 604 storing of the data object is carried out responsive to a command to store, received from the first EDN 140. In other embodiments, the UE 10 is configured to store 604 the data object 60 responsive to receiving information or analyzing received information. In some embodiments, the first EDN 140 issues a command to the UE 10 to store the data object 60, or transmits information associated with where the application context is stored, responsive to use of an Edge Application Server, such as one of a plurality of Edge Application Servers, to support an application client in the UE 10. For example, if the first EDN 140 switches from using one Edge Application Server to another Edge Application Servers, the first EDN 140 may transmit information or a command to configure the UE 10 to store a new data object 60, or a new component part 61, 62 of the data object 60. Dependent on when the data object 60 is stored 604, of which various different exemplary embodiments have been described, application data traffic may be conveyed 602 before and/or after the storing 604 of the data object 60.

At some stage, the UE may initiate connection 608 to the second EDN 150. As noted, this may be caused be mobility, or expected mobility, of the UE 10, or for other reasons. Where the second EDN is configured to take over responsibility and service of supporting the edge application with respect to the UE 10, or be added to support the UE 10, the data object 60, or parts 61, 62 of the data object 60, are uploaded 610 from the UE 10 to the second EDN 150. The upload 610 of the data object 60 may be included in a process of connecting or registering to the second EDN 150. Alternatively, a separate procedure for uploading 610 the data object 60 is carried out before or after registering or connecting to the second EDN 150.

In a process where service support of an Edge application is moved from the first EDN 140 to the second EDN 150, the transfer of the application context may be referred to as relocation of application context. Moreover, the first EDN 140 may be referred to as a source EDN 140, and the second EDN 150 may be referred to as a target EDN 150.

In various embodiments, the initiation of connection 608 to the second EDN 150 is carried out after disconnecting 606 from the first EDN 140. The UE 10 then maintains the stored data object 60 after disconnecting from the first EDN 140. In an alternative embodiment, the connection initiation 608 to the second EDN 150 is carried out while a connection is maintained with the first EDN 140, similar to the scenario of FIG. 5.

Based on the uploaded 610 data object 60, the second EDN 150, which provides a new Edge Hosing Environment, is enabled to resolve which entity previously handled that UE 10. Using the routing information of the data object 60, the second EDN 150 thus obtains 612 the application context from the previous, first, EDN 140. This involves transmitting at least the context identifier 60 to the previous EDN 140, as identified by the routing information, wherein the previous EDN, being uniquely capable of identifying the application context based on the context identifier 62, retrieves and transmits the application context to the second EDN 150.

The second EDN 150 is thereby configured to establish 614 service support to allocate edge computing resources to the UE 10 for the application to which the application context relates. The UE 10 may thereby be provided with preserved service support, in the use of the application in question. Moreover, the transfer of the application context is carried out without the first EDN 140 having to expose information related to its network structure, such as the EAS storing the application context.

Application data traffic may subsequently be transferred 616 between an Edge Application Client in the UE 10 and an Edge Application Server in the second EDN 150.

At some point after the second EDN 150 has established support 614, the UE 10 stores 618 a new data object 60. The data object comprises routing information to the second EDN 150, comprising a first component 61, usable by other EDNs to identify the second EDN 150. As described, the first component 61 may identify which EDN entity, e.g. Edge Configuration Server, Edge Enabler Server or Edge Application Server, that was the previous one, or last, to hold or handle the application context of that UE 10, in the second EDN 150. The data object 60 may further comprise a second component 62, usable by said EDN entity on the second EDN 150 to identify the specific application context of the UE 10 on a specific Edge Application Server of the second EDN 150. The second component thus comprises a context identifier, uniquely identifying the application context of the UE 10 on an Edge Application Server in the second EDN 150. Like for the first EDN 140, the EDN 150 thus shares information 61, 62, in the data object, which is strictly usable in that EDN 150 to identify the application context associated with the UE 10, without having to expose internal information such as EAS Identity. The EDN 150 is thus uniquely configured to determine and the location of, and retrieve, the application context in the EDN 150. In some embodiments, the context identifier 62 may be, or be based on, a random number or a hash value, known or decodable solely by the EDN 150 storing the application context.

Whereas FIGS. 6A and 6B provide a description of various embodiments in a straightforward manner, combinations of various embodiments and how they may be realized will now be described with reference to FIG. 7 with respect to the UE 10, and FIG. 8 with respect to the second EDN 150.

FIG. 7 schematically illustrates steps carried out in a UE 10, for enabling transfer of application context from a first edge data network to a second edge data network. The UE 10 comprises a wireless transceiver 213 configured for communication with a wireless network 100, 101, and a data memory 215. The UE 10 further comprises logic 210 comprising data storage 212 configured to store computer program code and a processor 211 configured to execute the computer program code. The logic is thereby configured to carry out the steps described herein in association with tasks carried out by the UE 10.

With reference to FIG. 7, the UE 10 has been connected to a first EDN 140. The UE 10 has thereby obtained 700 some data associated with the handling of application context in the first EDN 140.

In step 702, the UE stores a data object 60 comprising routing information 61 to the first EDN 140. This corresponds to step 604.

In step 704 the UE 10 may disconnect from the first EDN 140. This corresponds to step 606. Alternatively, the UE 10 remains connected to the first EDN 140.

In step 706, the UE 10 connects to the second EDN 150, and thereby uploads the data object 60 to the second EDN 150 to enable the second EDN 150 to obtain the application context from the first EDN 140 by using said routing information 61. This corresponds to step 610.

This solution provides a convenient way of obtaining transfer, or relocation, of application context when a UE 10 connects to be served by a second, target, EDN 150, in particular when connecting to the second EDN 150 after disconnecting from the former, source, EDN 140.

In some embodiments, the data object further comprises a context identifier 62, uniquely identifying the application context of the UE on an application server in the first EDN 140.

FIG. 8 schematically illustrates steps carried out in an EDN 150, such as a target EDN 150, for enabling transfer of application context from a previous EDN 140, such as a source EDN 140, to the target EDN 150. The EDN 150 comprises a communication interface or reference point 313 configured for communication with other EDNs and with UEs 10. The EDN 150 further comprises logic 310 comprising data storage 312 configured to store computer program code and a processor 311 configured to execute the computer program code. The logic 310 is thereby configured to carry out the steps described herein in association with tasks carried out by the EDN 150, inter alia for obtaining application context of a UE 10 which connects to the EDN 150.

With reference to FIG. 8, the EDN 150 receives a data object 60 from the UE 10, said data object comprising routing information 610 to a previous EDN 140 to which the UE 10 has been connected, and from which the UE may have disconnected. This corresponds to step 610.

The EDN 150 thereby obtains the application context from the previous EDN 140, using said routing information 61, for providing edge computing resources to said UE. This corresponds to step 612.

The EDN 150 thereby establishes, or concludes, a connection to the UE 10 based on the application context to provide edge computing service support to said UE 10.

By means of this process, a convenient way of transferring, or relocating, application context for a UE 10 is obtained.

The data object 60 may comprise a source identifier 61, identifying a server of the previous EDN 140 which server holds the application context. The data object 60 may further comprise a context identifier 62, uniquely identifying the application context of the UE on an application server in and by the previous EDN 140.

Various embodiments have been described in the foregoing, which may be combined in any way that is not directly contradictory.

The invention claimed is:

1. A method carried out in a user equipment (UE) for enabling transfer of application context from a first edge data network to a second edge data network, comprising:
storing, in the UE, a data object, said data object comprising:
routing information to the first edge data network, and
a context identifier, based on which the first edge data network uniquely can identify the application context of the UE on an application server in the first edge data network;

uploading, upon connecting to the second edge data network, the data object to the second edge data network to enable the second edge data network to obtain the application context without knowledge of an identity of the application server, in response to supplying the context identifier to the first data network.

2. The method of claim 1, wherein said application server is an edge enabled server or an edge configuration server.

3. The method of claim 1, wherein said data object comprises a Fully Qualified Domain Name (FQDN).

4. The method of claim 1, wherein the data object is stored while the UE is connected to the first edge data network, the method further comprising:

disconnecting from the first edge data network; and connecting to the to the second edge data network after disconnecting from the first edge data network.

5. A User Equipment (UE) configured to execute an edge application using an edge data network, comprising:

a wireless transceiver configured for communication with a wireless network;

a data memory; and logic configured to:

operate an edge computing client module comprising at least one application client;

store a data object in the data memory, said data object comprising:

routing information to a first edge data network to which the UE has been connected; and a context identifier, based on which the first edge data network uniquely can identify an application context of the UE, related to the application client, on an application server in the first edge data network;

upload, upon connecting to a second edge data network, the data object to the second edge data network to enable the second edge data network to obtain the application context without knowledge of an identity of the application server, in response to supplying the context identifier to the first data network.

6. The UE of claim 5, wherein said application server is an edge enabled server or an edge configuration server.

7. The UE of claim 5, wherein said data object comprises a Fully Qualified Domain Name (FQDN).

8. The UE of claim 5, wherein the logic is configured to store the data object while the UE is connected to the first edge data network, the logic further being configured to:

disconnect from the first edge data network; and connect to the to the second edge data network after disconnecting from the first edge data network.

9. A method carried out in an edge data network for obtaining application context of a User Equipment (UE) connecting to the edge data network, the method comprising:

receiving a data object from the UE, said data object comprising:

routing information to a previous edge data network to which the UE has been connected, and a context identifier, uniquely identifying the application context of the UE on an application server in the previous edge data network;

transmitting, using said routing information and without knowledge of an identify of the application server, the context identifier to the previous edge data network;

obtaining the application context from the previous edge data network, based on the context identifier;

establishing a connection to the UE based on the application context to provide edge computing service support to said UE.

10. The method of claim 9, wherein said application server is an edge enabled server or an edge configuration server.

11. The method of claim 9, wherein said data object comprises a Fully Qualified Domain Name (FQDN).

* * * * *